United States Patent
Ouyang et al.

(10) Patent No.: US 9,268,814 B2
(45) Date of Patent: Feb. 23, 2016

(54) ENABLEMENT OF QUASI TIME DEPENDENCY IN ORGANIZATIONAL HIERARCHIES

(71) Applicant: SAP SE, Walldorf (DE)

(72) Inventors: Le Ouyang, Shanghai (CN); Thomas Pike, Kenzingen (DE); Huiming Zhang, Shanghai (DE); Klaus Weiss, Hassloch (DE); Houbing Liu, Shanghai (CN)

(73) Assignee: SAP SE, Walldorf (DE)

( * ) Notice: Subject to any disclaimer, the term of this patent is extended or adjusted under 35 U.S.C. 154(b) by 132 days.

(21) Appl. No.: 14/052,412

(22) Filed: Oct. 11, 2013

(65) Prior Publication Data

US 2014/0040303 A1    Feb. 6, 2014

Related U.S. Application Data

(62) Division of application No. 13/310,068, filed on Dec. 2, 2011, now Pat. No. 8,577,841.

(30) Foreign Application Priority Data

Nov. 8, 2011  (CN) .......................... 2011 1 0351435

(51) Int. Cl.
  *G06F 7/00*   (2006.01)
  *G06F 17/00*  (2006.01)
  *G06F 17/30*  (2006.01)

(52) U.S. Cl.
  CPC .... *G06F 17/30442* (2013.01); *G06F 17/30309* (2013.01)

(58) Field of Classification Search
  CPC ... G06F 8/71; G06F 17/3023; G06F 9/44536; G06F 17/30309; Y10S 707/99954

USPC .................................................. 707/766, 638
  See application file for complete search history.

(56) References Cited

U.S. PATENT DOCUMENTS

| | | | | |
|---|---|---|---|---|
| 5,317,729 | A  * | 5/1994 | Mukherjee | G06Q 10/087 |
| 5,890,166 | A  * | 3/1999 | Eisenberg | G06F 17/30309 |
| 6,631,386 | B1 * | 10/2003 | Arun | G06F 17/30309 |
| 7,028,057 | B1 * | 4/2006 | Vasudevan | G06F 17/30309 707/695 |
| 2003/0200235 | A1* | 10/2003 | Choy | G06F 17/30309 |
| 2004/0225636 | A1* | 11/2004 | Heinzel | G06F 17/30 |
| 2005/0262495 | A1* | 11/2005 | Fung | G06F 8/65 717/170 |
| 2006/0179062 | A1* | 8/2006 | Weber | G06Q 30/02 |
| 2007/0162441 | A1* | 7/2007 | Idicula | G06F 17/3023 |

(Continued)

*Primary Examiner* — Binh V Ho
(74) *Attorney, Agent, or Firm* — Kenyon & Kenyon LLP (57) ABSTRACT

Changes to a hierarchical organizational structure may be stored in different versions of a data structure depicting the hierarchical organizational structure. Each of these versions may include a validity period field representing a time period that the hierarchical organizational structure depicted in the version accurately reflects the organizational structure of the organization. Each of the versions may also be designated as active or inactive. In some instances, each of the versions may be designated as inactive except for a version that reflects the organizational structure of the organization at a particular time, which may change over time. Historical copies of versions may be stored and subsequently recalled to identify an organizational structure that was in effect at a particular time in the past. The recalled version may then be used to limit the results of a query to a selected node of the historical organizational structure.

9 Claims, 7 Drawing Sheets

(56) References Cited

U.S. PATENT DOCUMENTS

| | | | |
|---|---|---|---|
| 2009/0249295 A1* | 10/2009 | Poole | G06F 8/71 717/120 |
| 2009/0287521 A1* | 11/2009 | Motoyama | G06Q 10/06312 705/7.22 |
| 2009/0313309 A1* | 12/2009 | Becker | G06F 17/30091 |
| 2012/0016867 A1* | 1/2012 | Clemm | G06F 17/2211 707/722 |
| 2012/0084257 A1* | 4/2012 | Bansode | G06F 17/30309 707/638 |
| 2013/0073465 A1* | 3/2013 | Richey | G06Q 40/02 705/44 |

* cited by examiner

Hierarchy Query 400

Saved Searches:

Search Criteria 404

| Cost Center Group | ▼ | is | ▼ | | |
| --- | --- | --- | --- | --- | --- |
| Cost Center Group Name | ▼ | is | ▼ | | |

☑ Maximum Number of Results: 100

Save Search As: ☐ Standard Hierarchy

[Search] [Clear Entries] [Reset to Default]

Result List: Cost Center Group

[New] [Edit] [Copy to Inactive Version] | [Check and Help] 403

| Controlling Area | Cost Center Group | Name |
| --- | --- | --- |
| 0001 | CCGPMK | Marketing dep. |
| 0001 | CCGPMK01 | Team 01 of marketing dep. |
| 0001 | CCGPMK02 | Team 02 of marketing dep. |
| 0001 | CCGROUP_CH | Cost Center Group - created by CH |
| 0001 | CCGR_881 | Asia Pacific |
| 0001 | CCGR_FIN | Financial China |
| 0001 | CCTR_GRP | No Text Available |
| 0001 | CCYY13 | No Text Available |
| 0001 | CC_GRP_CH | Test Standard Hier |
| 0001 | CGR001 | RT Test |

Area Identifier 401     Hierarchy Identifier 101     Description 402

FIG. 4B

Hierarchy Version Assignment 410

Controlling Area: 0001 ← Area Identifier 401
Cost Center Group: CCGPMK ← Hierarchy Identifier 101
Version:
Inactive Version: JS_TEST2

Search Inactive Version

Results List: 11 results found for Inactive Version

| Valid From | Hier. Version ID | Description |
|---|---|---|
| 07.04.2011 | JS_TEST2 | Janet Test 07.04 |
| 13.04.2011 | 2011-MAY | May 2011 |
| 30.04.2011 | 2011_MAY | 2011 May |
| 01.05.2011 | MK_2011B | mk_2011 valid from 01.05.2011 B |
| 01.06.2011 | 2011-JUN | June 2011 |
| 01.06.2011 | MK_2011C | mk_2011 valid from 01.06.2011 C |
| 30.06.2011 | 2011_Q3 | 2011 Quarter 3 |
| 01.02.2012 | 2012Q1 | 2012Q1 |
| 01.01.2015 | YY2015 | version for 2015 |
| 01.01.2022 | MK111 | 2010Q1 ← Description 413 |

↑ Validity Period 411    ↑ Version Identifier 412

ENABLEMENT OF QUASI TIME DEPENDENCY IN ORGANIZATIONAL HIERARCHIES

RELATED APPLICATION TO RELATED APPLICATIONS

The present application is a divisional of, and claims priority to, U.S. patent application Ser. No. 13/310,068, filed on Dec. 2, 2011, which is hereby incorporated by reference in its entirety. The present application also claims the benefit Chinese Patent Application No. 201110351435.7 filed Nov. 8, 2011, the contents of which is also incorporated herein by reference.

BACKGROUND

Many organizations have hierarchical organizational structures. For example, organizations may be structured into different parent and subsidiary companies. Hierarchical structures may also be implemented within individual companies as different divisions, departments, and groups within a company may be organized hierarchically. For example, groups and division may be organized by product and/or geographic area, so that similar groups of products may be part of a same division covering a particular geographic area. Hierarchies may also be used to organize data by type, function, or other criteria. For example, cost and/or profit centers of an organization may be organized into hierarchical groups in a tree structure according to a product type, geographic location, department organization, or other criteria. One or more nodes in the tree structure may then be selected to identify particular data of interest in a query or other data inquiry.

In many organizations, these hierarchical structures may change periodically as the organization reorganizes, merges, acquires another entity, or otherwise restructures. As the hierarchical structures change, the data structure in the organization's computing systems representing the hierarchy must also be updated. In many instances, the data structure is updated by overwriting the existing the data structure with the new hierarchical information. While the existing data structure may then accurately reflect an updated hierarchy, this procedure may make it difficult to retrieve and use past hierarchical information when querying historical data.

The inventors perceive a need to timely update hierarchical data structures as a hierarchical structure of an organization changes while preserving and making accessible historical hierarchical structures.

DETAILED DESCRIPTION

In an embodiment of the invention, changes to a hierarchical organizational structure may be stored in different versions of a data structure depicting the hierarchical organizational structure. Each of these versions may include a validity period field representing a time period that the hierarchical organizational structure depicted in the version accurately reflects the organizational structure of the organization. The validity period may be unique in each version so that only one version of the organizational structure is valid at a time.

Each of the versions may also be designated as active or inactive. In some instances, each of the versions may be designated as inactive except for a version that reflects the organizational structure of the organization at a particular time, as indicated in the validity period field. The particular time may be a current time or some other identified past or future time. A processing device may check the validity period fields of each version to identify the version that accurately reflects the organizational structure of the organization at the identified time. The identified version may then be designated as the active version and the previously active version may be designated as inactive.

In some instance, a copy of each active version of the data structure may be kept for archival or other purposes. The copy may also include data identifying the period of time that the version was active. In some instances, this time period data may be similar to that included in the validity period field. In other instances, the time period data may be used to identify the time period that the version was actually designated as active.

The copies may later be used to retrieve and/or present historical organizational structure information. For example, if a user wants to analyze a specific set of past data, for example, through a query, the copies of the historical organizational structure that were active at that time may be retrieved and presented to the user to enable the user to select particular nodes in the structure or otherwise use the information contained in structure to analyze the past data.

Figure 1:
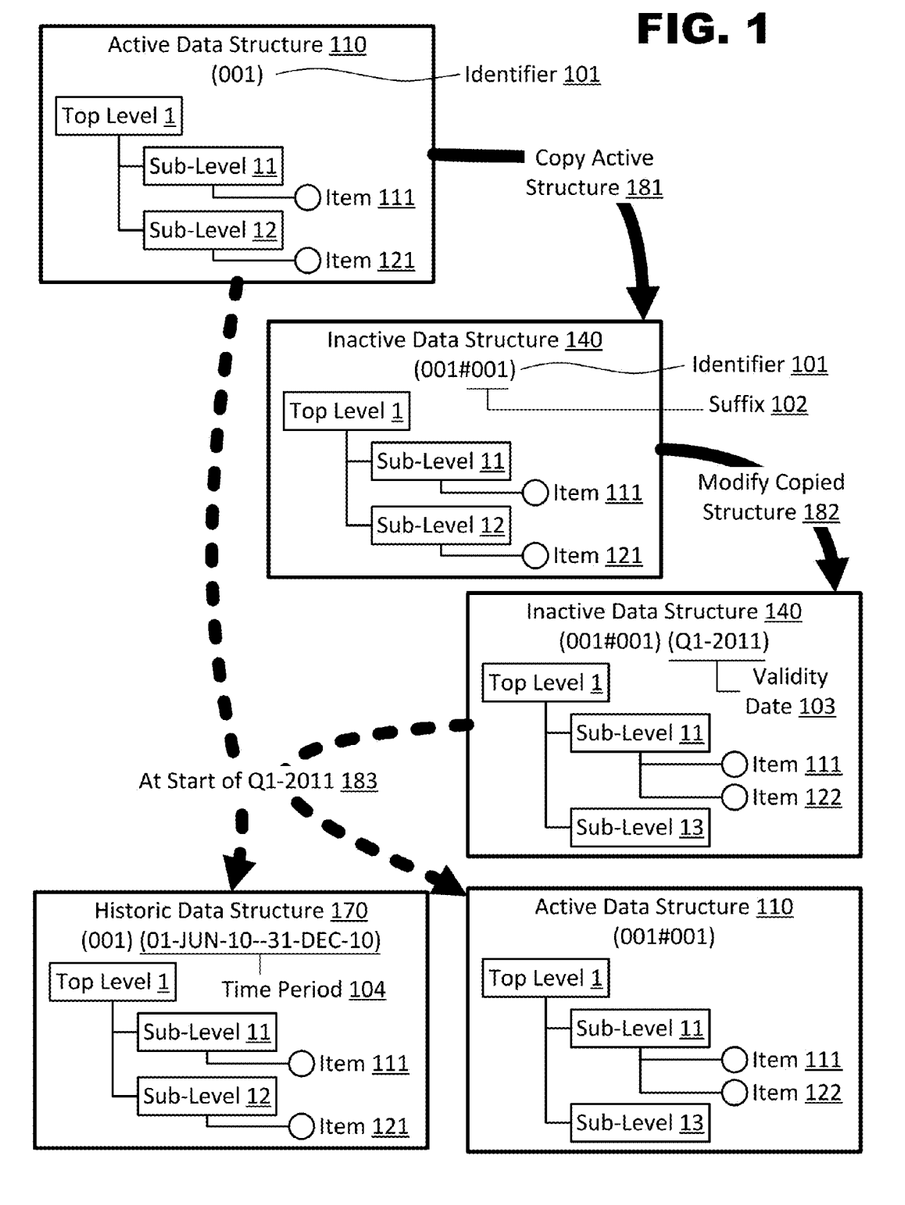
FIG. 1 shows an exemplary transitioning of an exemplary data structure between states in an embodiment.

FIG. 1 shows a transitioning of an exemplary data structure between active 110, inactive 140, and historic 170 states. A first active data structure 110 may show a hierarchical structure of an organization. The hierarchical structure may be any type of hierarchy in an organization, such as a management hierarchy, department hierarchy, cost/profit center hierarchy, parent/subsidiary company hierarchy, business process hierarchy, workflow/approval hierarchy, and so on.

This hierarchical structure may have a top level 1, sublevels 11 and 12, and items 111 and 121 assigned to each respective sublevel. Each of these different levels 1, 11, 12, and items 111 and 121 may be different nodes selectable by a user. In some embodiments, only certain nodes may be selectable, such as items 111 and 112, though in other embodiments, any of the nodes may be selectable.

A user may select one or more the nodes to limit a set of data to the data associated with the selected nodes and/or any nodes subordinate to the selected node. Thus, if a user were to select sub-level 11 in active data structure 110, in so doing the user may limit a set of data to that associated with the sub-level 11 node. In some instances, this limited set of data may also include data associated with sub-level 11's subordinate node item 111.

Each of the data structures may include an identifier 101. Organizations may have several different hierarchies for different departments, business processes, workflows, and so on. The identifier 101 may identify the specific hierarchy out of the several different type s of organizational hierarchies that the data structure represents. In this example, the identifier 101 indicates that the active data structure 110 is hierarchy type 001.

The active data structure 110 may be copied 181 to create one or more duplicate data structures that may be inactive 140. The duplicate data structures 140 may have an additional suffix 102 appended as part of the identifier 101 to differentiate them from each other and the active version 110. Each additional version of this data structure may have a unique suffix 102 appended to its identifier 101 to distinguish it from the other data structures.

Each duplicated data structure 140 may then be modified 182 to create a different version of the organizational structure. The modifications 182 shown in FIG. 1 include adding an additional item 122 subordinate to sub-level 11, removing sub-level 12 and item 121, and adding a new sub-level 13 subordinate to top level 1.

This modification to the organizational structure may take effect beginning in the first quarter of 2011, which may be specified in a validity period field 103 included in the data structure 140. The validity period field 103 may be used to ensure that the organization's computing systems seamlessly reflect this organizational structure change on the effective date during which the data structure is to become active. The validity period field 103 may include an identifier of a date the data structure 140 is to be activated and the organizational structure shown in the data structure is to take effect. In this example, the data structure 140 may be activated beginning at the start of the first quarter of 2011, which may also be when the new organizational structure shown is to take effect. In this example, the validity period "Q1-2011" representing the first quarter of 2011 may be included as part of the inactive data structure 140.

Once the first quarter of 2011 has begun 183, the active data structure 110 may be copied into a historical data structure 170. The historic data structure 170 may include a time period identifier 104 that identifies the time period that historic data structure 170 was active. The time period identifier 104 of each of the historic data structures 170 may then later be searched to identify the particular data structure that was active during a specified time.

After the active data structure 110 has been copied, the contents of the inactive data structure 140 having a validity period commencing in the first quarter of 2011 may then replace the contents of the formerly active data structure 110, so that the current organization structure may be presented as the active data structure.

Figure 2:
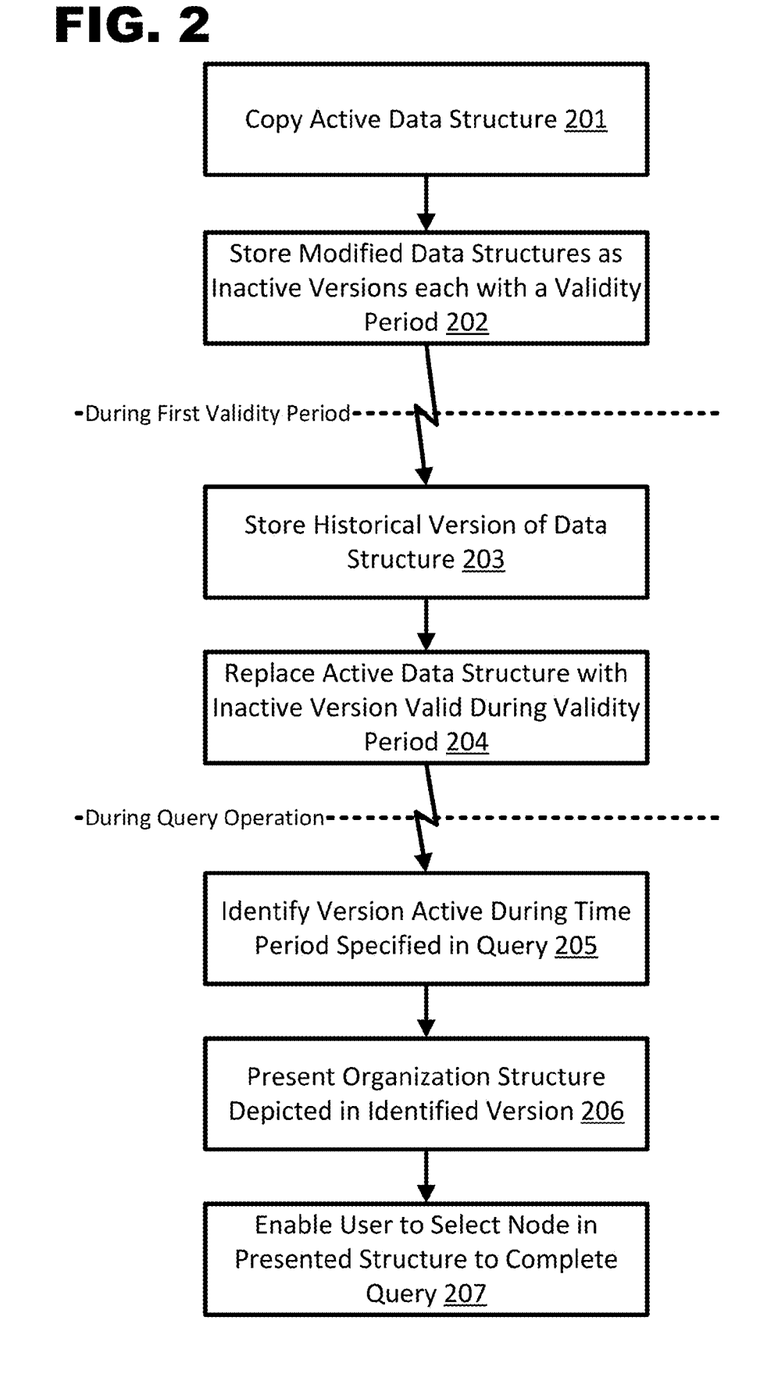
FIG. 2 shows a first exemplary method in an embodiment of the invention.

FIG. 2 shows a first exemplary method in an embodiment of the invention. In box 201, an active version of a data structure depicting a hierarchical organizational structure may be copied. In box 202, the copied version may then be modified to reflect changes to the organization structure and the modified version may then be stored as an inactive version together with a validity period indicating when the inactive version is to be active. Once the validity period has been reached, in box 203, a copy of the active version of the data structure may be stored as a historical version together with a time period indicating a time the historical version was active. In box 204, the active version may be replaced with the stored inactive version at the validity date.

Later, responsive to a query specifying a second time period, in box 205, a version of the data structure active during the second time period may be identified. In box 206, the hierarchical organizational structure depicted in the identified version may then be presented to a user. In box 207, the user may also be presented with an option to select one or more nodes in the presented hierarchical organizational structure to complete the query. In some instances, the output of the query may be limited to data associated with these selected node(s).

In some instances, the validity period may be stored in two fields, a valid from field identifying a date the inactive version becomes active and a valid to field identifying a last date the inactive version remains active. In other instances, the validity period may initially only include a date that the inactive version becomes active. Once this date has been reached, the version may remain active until it is superseded by another inactive version that subsequently becomes active.

In some instances, the date the inactive version becomes active may be stored in the valid from field when the inactive version is stored and the last date the inactive version remains active may be stored in the valid to field when the last date occurs and the inactive version is no longer active. In other instances, the date the inactive version becomes active may be stored in the valid from field when the inactive version is stored and the last date the inactive version remains active may be stored in the valid to field when the inactive version is stored.

A version of the data structure that may be active during a time period specified in a query may be identified by comparing the time period specified in the query to the time periods of the data structure indicating the active period(s) of the data structure. Each inactive version of the data structure may also include a unique identifier that need not be visible to the user. The unique identifier may includes a different suffix for each version of the data structure. The suffix may, in some instances, remain constant as the version transitions between the active, inactive, and historical states. In an embodiment, the suffix may include the validity period or a portion thereof.

Figure 3:
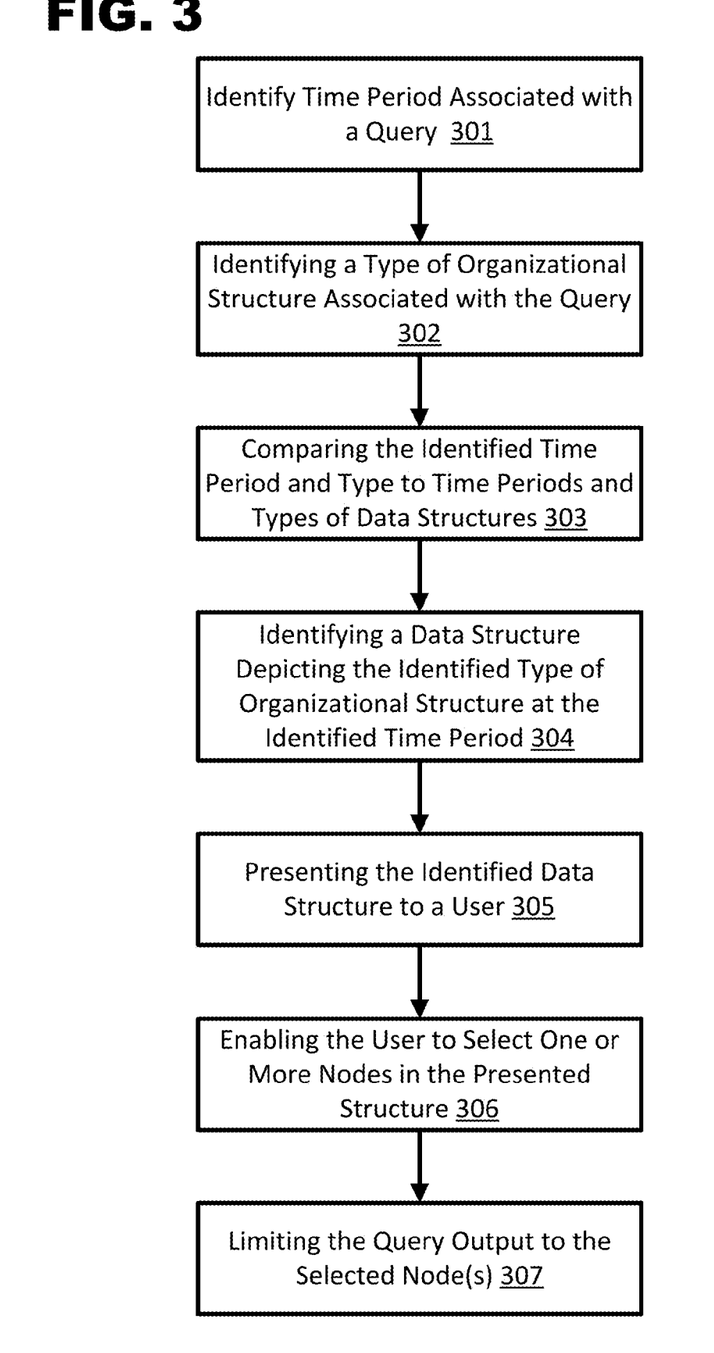
FIG. 3 shows a second exemplary method in an embodiment of the invention.

FIG. 3 shows a second exemplary process in an embodiment of the invention. In box 301, a time period encompassing an output of a query may be identified. In box 302, a type of hierarchical organizational structure associated with the query output may be identified. In box 303, the identified time period and the identified type of hierarchical organization structure may be compared to respective fields of a plurality of data structures specifying an active time period of each data structure and a type of hierarchical organizational structure in each data structure.

In box 304, the data structure depicting the identified type of hierarchical organizational structure that was active at the identified time period may be identified. In box 305, the hierarchical organizational structure depicted in identified data structure may be presented to a user. In box 306, the user may presented with an opportunity to select a node in the presented hierarchical organizational structure. Finally, in box 307, the output of the query may be limited to data associated with one or more of the nodes selected by the user.

Figure 4A:
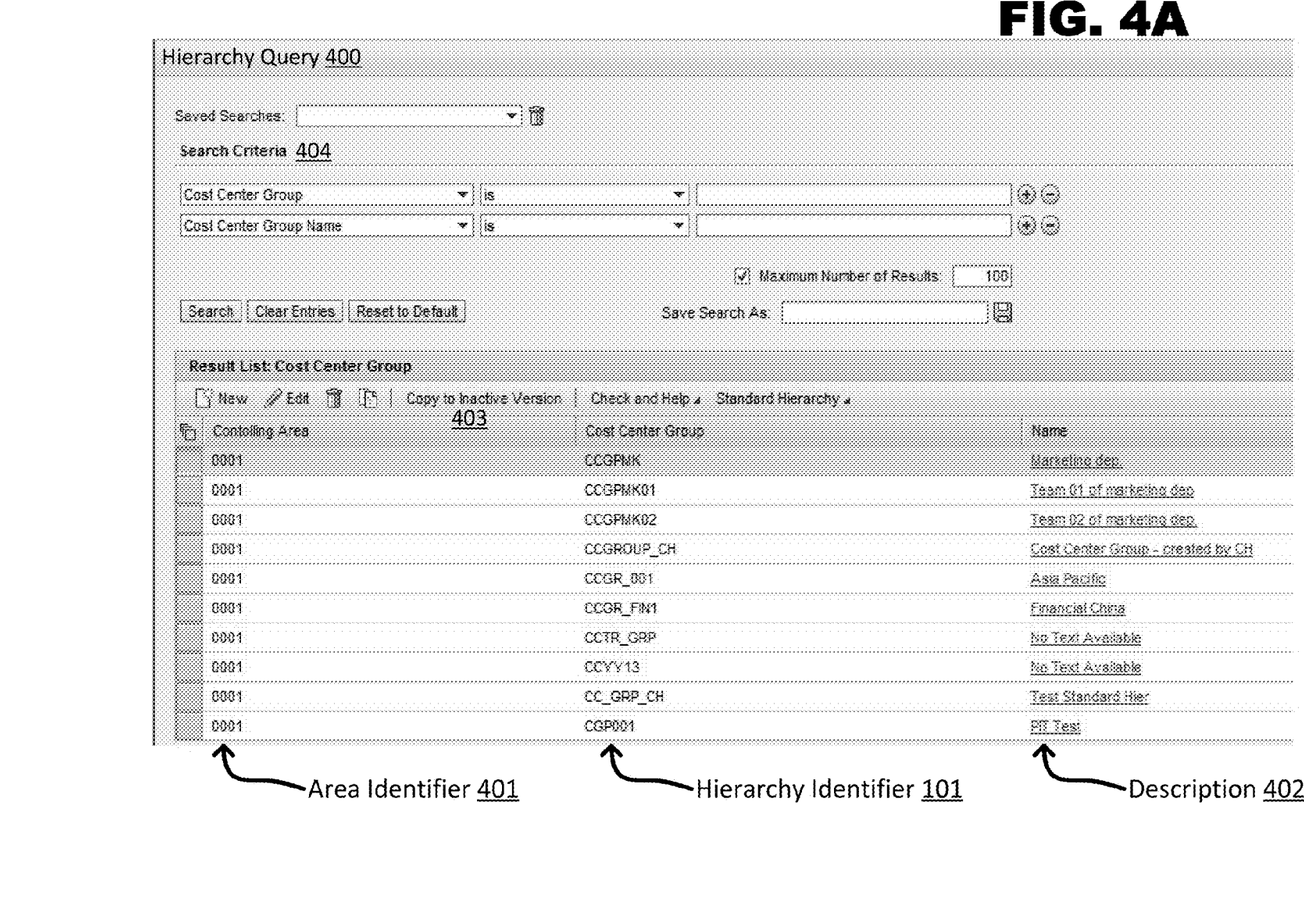
FIGS. 4A to 4C show different exemplary interfaces in different embodiments relating to cost center hierarchies.
Figure 4B:
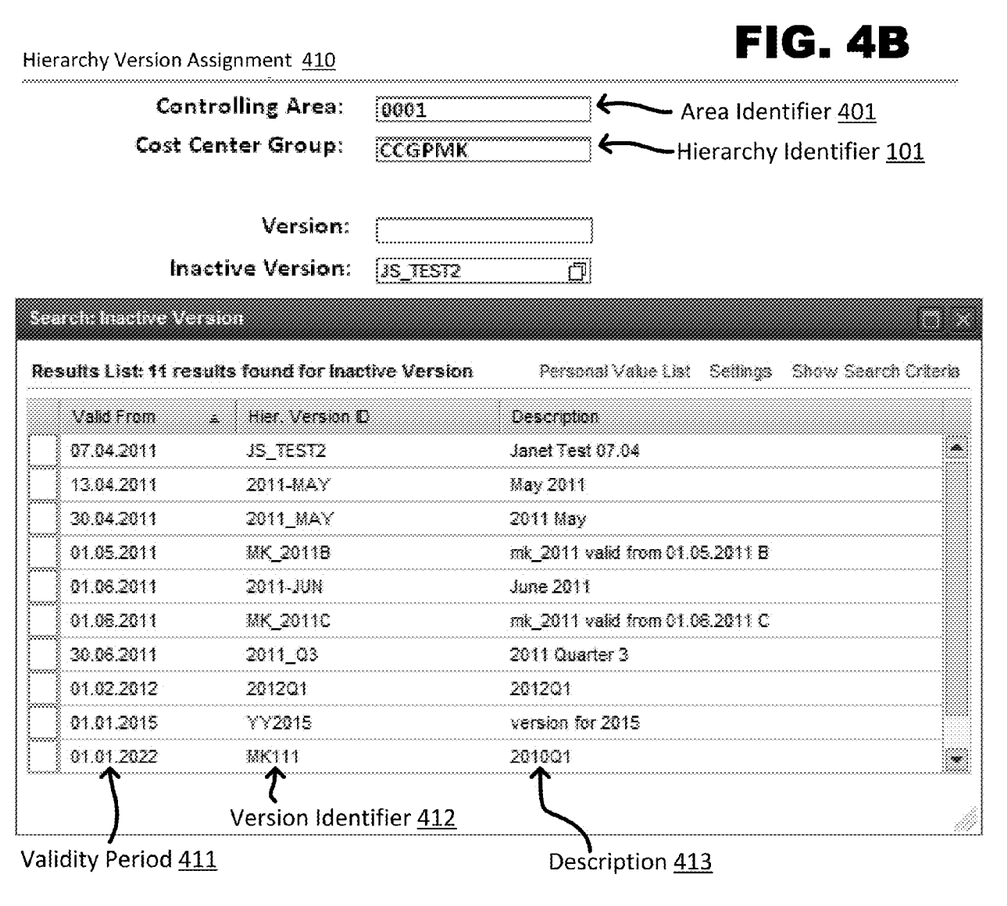
Figure 4C:
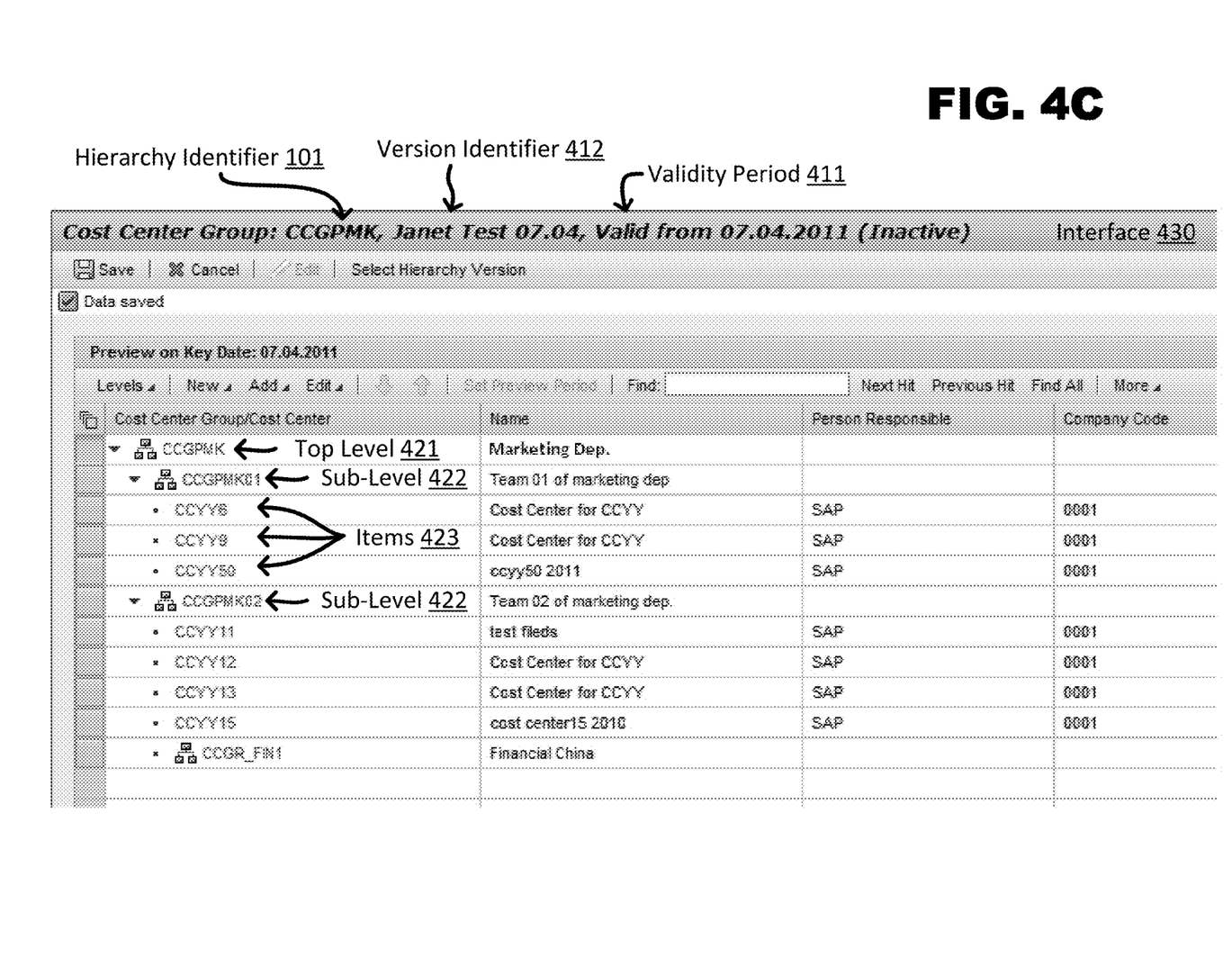

FIGS. 4A to 4C show different exemplary interfaces in different embodiments relating to cost center hierarchies. FIG. 4A shows an exemplary interface for querying 400 different hierarchies stored in one or more data structures. The query interface 400 may include a search criteria section 404 where a user may specify one or more search criteria. The results of the query may be organized in a list and may include an area identifier 401, hierarchy identifier 101, and description 402. The area identifier 401 may identify a department, organization, or other entity to which a hierarchy included in the result list belongs. The one or more hierarchies in the result list may include a hierarchy identifier field 101 identifying the hierarchy included in the result list. A description of the hierarchy may also be provided in the description field 402. One or more of the hierarchies in the result list may be selected and copied to create an inactive copied version 403 of the hierarchy through a button or other medium.

FIG. 4B shows an exemplary interface for selecting a hierarchy version 412 to assign 410 to a particular area 401 and hierarchy 101. assigning a versions of a hierarchy 410. A query or search of different inactive hierarchy versions may be conducted and the results, including a validity period field 411, version identifier field 412, and description field 413, may be presented to the user. The user may then select one of the hierarchy versions and the version identifier 412 of the selected hierarchy version may be assigned 410 to the respective area 410 and hierarchy 101.

In other embodiments, an interface may be used to search for different hierarchy versions assigned 410 to particular areas 401 and/or hierarchy. In these other embodiments, a user may enter an area identifier 401, hierarchy identifier 101, hierarchy version, or other search criteria and a list of the active and/or inactive versions of the hierarchy may be presented. The hierarchies displayed in the list may include a validity period 411, hierarchy version identifier 412, and/or description 413 of the version. One or more of the hierarchy versions may then be selected to view and/or change the data associated with that version.

FIG. 4C shows an exemplary interface 430 to view and/or modify a hierarchy. The interface may include a hierarchy identifier 101, version identifier 412, and validity period 411 of the hierarchy. The interface 430 may also include one or more levels, including a top level 421 and one or more sublevels 422, as well as one or more items 423. Levels and items may be added, changed, and moved to superordinate or subordinate positions in the hierarchy. Additional attributes or properties may also be added or changed with respect to the hierarchy in general, as well as with respect to the levels and items within the hierarchy.

Figure 5:
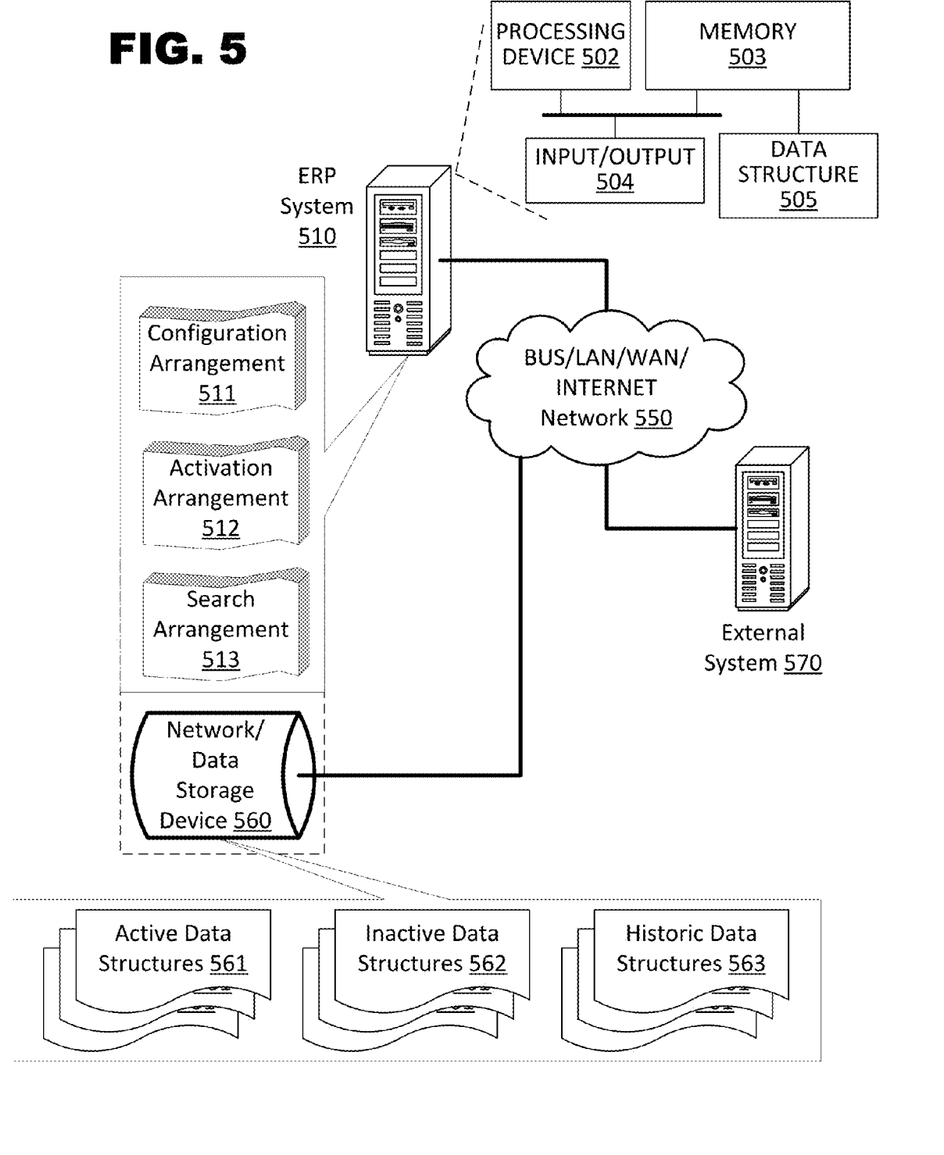
FIG. 5 shows an exemplary architecture in an embodiment of the invention.

FIG. 5 shows an exemplary architecture in an embodiment of the invention. Enterprising resource planning (ERP) system 510 may include a configuration arrangement 511, activation arrangement 512, and search arrangement 513.

The configuration arrangement 511 may enable the creation, modification, and/or configuration of hierarchical data structures. The configuration arrangement 511 may include hardware and other functionality to enable a user or program to create and/or modify hierarchical organizational structures and then save them as part of one or more data structures.

The activation arrangement 512 may identify and then activate different versions of the data structures during a validity period when the hierarchical organizational structure included in the data structure is effective and valid and/or deactivate a version of the data structure during a period when the when the hierarchical organizational structure included in the data structure is not in effect. The activation arrangement 512 may include hardware, such as processing device or comparator, as well as other functionality to enable the identification, activation, and/or deactivation of those data structures that should be activated and/or deactivated at a given moment.

The search arrangement 513 may identify a version of data structure active during a time period specified as part of a query and then present the hierarchical organizational structure of the identified version to a user to enable the user to a select one or more nodes in the hierarchical organizational structure in order to complete the query and/or limit the results of the query to the select node(s). The search arrangement 513 may include hardware, such as processing device or comparator, as well as other functionality to enable the identification of the active versions of a data structure during the time period specified as part of a query.

ERP system 510 may be connected to a network 550. Network 550 may include a LAN, WAN, bus, or the Internet. ERP system 510 may interface with other systems and components depending on the application. For example, a network/data storage device 560 may be used to store the different types of data structures, including active 561, inactive 562, and historic 563 versions of the data structures. The storage device 560 may be a part of the ERP system 510. In some embodiments the network storage device 560 may also be separate from the ERP system 510 but connected to it through network 550. The storage device 560 may contain a hard disk drive, flash memory, or other computer readable media capable of storing data. Other external systems and data sources 570 may also be connected to network 550. These other systems 570 may be used to supply additional data or information used by the ERP system 510, such as, for example, the initial data used to populate the generated data structures.

Each of the systems, clients, and devices in FIG. 5 may contain a processing device 502, memory 503 storing loaded data or a loaded data structure 505, and an communications device 504, all of which may be interconnected via a system bus. In various embodiments, each of the systems 510, 560, and 570 may have an architecture with modular hardware and/or software systems that include additional and/or different systems communicating through one or more networks. The modular design may enable a business to add, exchange, and upgrade systems, including using systems from different vendors in some embodiments. Because of the highly customized nature of these systems, different embodiments may have different types, quantities, and configurations of systems depending on the environment and organizational demands.

Communications device 504 may enable connectivity between the processing devices 502 in each of the systems and the network 550 by encoding data to be sent from the processing device 502 to another system over the network 550 and decoding data received from another system over the network 550 for the processing device 502.

In an embodiment, memory 503 may contain different components for retrieving, presenting, changing, and saving data. Memory 503 may include a variety of memory devices, for example, Dynamic Random Access Memory (DRAM), Static RAM (SRAM), flash memory, cache memory, and other memory devices. Additionally, for example, memory 503 and processing device(s) 502 may be distributed across several different computers that collectively comprise a system.

Processing device 502 may perform computation and control functions of a system and comprises a suitable central processing unit (CPU). Processing device 502 may include a single integrated circuit, such as a microprocessing device, or may include any suitable number of integrated circuit devices and/or circuit boards working in cooperation to accomplish the functions of a processing device. Processing device 502 may execute computer programs, such as object-oriented computer programs, within memory 503.

The foregoing description has been presented for purposes of illustration and description. It is not exhaustive and does not limit embodiments of the invention to the precise forms disclosed. Modifications and variations are possible in light of the above teachings or may be acquired from the practicing embodiments consistent with the invention. For example, some of the described embodiments may include software and hardware, but some systems and methods consistent with the present invention may be implemented in software or hardware alone.

We claim:

1. A computer-implemented method comprising:
   identifying a time period encompassing an output of a query;
   identifying a type of hierarchical organizational structure associated with the query output;

comparing, using a processing device, the identified time period and identified type of hierarchical organization structure to respective fields of a plurality of data structures specifying an active time period of each data structure and a type of hierarchical organizational structure in each data structure;

identifying a data structure depicting the identified type of hierarchical organizational structure and active at the identified time period from the comparing;

presenting the hierarchical organizational structure depicted in identified data structure to a user;

enabling the user to select a node in the presented hierarchical organizational structure to complete the query; and limiting the output of the query to the user selected node.

2. The method of claim 1, further comprising:

identifying a plurality of data structures depicting the identified type of hierarchical organizational structure and active at the identified time period from the comparing;

presenting the plurality of hierarchical organizational structures to the user; and enabling the user to select at least one node in any of the presented hierarchical organizational structures to limit the output of the query to the at least one user selected node in its respective hierarchical organizational structure.

3. The method of claim 1, further comprising:

enabling the user to select a plurality of nodes in the presented hierarchical organization structure, and limiting an output of the query to data associated with the selected nodes.

4. A non-transitory computer-readable medium having program instructions, which when executed perform a method, the method comprising:

identifying a time period encompassing an output of a query;

identifying a type of hierarchical organizational structure associated with the query output;

comparing, using a processing device, the identified time period and identified type of hierarchical organization structure to respective fields of a plurality of data structures specifying an active time period of each data structure and a type of hierarchical organizational structure in each data structure;

identifying a data structure depicting the identified type of hierarchical organizational structure and active at the identified time period from the comparing;

presenting the hierarchical organizational structure depicted in identified data structure to a user;

enabling the user to select a node in the presented hierarchical organizational structure to complete the query; and limiting the output of the query to the user selected node.

5. The non-transitory computer-readable medium of claim 4, the method further comprising:

identifying a plurality of data structures depicting the identified type of hierarchical organizational structure and active at the identified time period from the comparing;

presenting the plurality of hierarchical organizational structures to the user; and enabling the user to select at least one node in any of the presented hierarchical organizational structures to limit the output of the query to the at least one user selected node in its respective hierarchical organizational structure.

6. The non-transitory computer-readable medium of claim 4, the method further comprising:

enabling the user to select a plurality of nodes in the presented hierarchical Organization structure, and limiting an output of the query to data associated with the selected nodes.

7. A system, comprising:

a processing device;

a storage device storing active, inactive, and historic versions of a data structure depicting a hierarchical organizational structure;

a search arrangement to:

identify a time period encompassing an output of a query;

identify a type of hierarchical organizational structure associated with the query output;

compare the identified time period and identified type of hierarchical organization structure to respective fields of the data structures stored on the storage device, which specify an active time period of each data structure and a type of hierarchical organizational structure in each data structure;

identify a data structure depicting the identified type of hierarchical organizational structure and active at the identified time period from the comparing;

present the hierarchical organizational structure depicted in identified data structure to a user;

enable the user to select a node in the presented hierarchical organizational structure to complete the query; and limit the output of the query to the user selected node.

8. The system of claim 7, wherein the search arrangement is further configured to:

identify a plurality of data structures depicting the identified type of hierarchical organizational structure and active at the identified time period from the comparing;

present the plurality of hierarchical organizational structures to the user; and enable the user to select at least one node in any of the presented hierarchical organizational structures to limit the output of the query to the at least one user selected node in its respective hierarchical organizational structure.

9. The system of claim 7, wherein the search arrangement is further configured to:

enable the user to select a plurality of nodes in the presented hierarchical organization structure, and limit an output of the query to data associated with the selected nodes.

* * * * *